(12) United States Patent
Noguchi et al.

(10) Patent No.: US 6,717,375 B2
(45) Date of Patent: Apr. 6, 2004

(54) DISCHARGE LAMP LIGHTING DEVICE AND SYSTEM COMPRISING IT

(75) Inventors: Toshiyuki Noguchi, Nishinomiya (JP); Yasuhiro Kakimoto, Takatsuki (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/343,347

(22) PCT Filed: Mar. 4, 2002

(86) PCT No.: PCT/JP02/01989

§ 371 (c)(1),
(2), (4) Date: Apr. 29, 2003

(87) PCT Pub. No.: WO02/093984

PCT Pub. Date: Nov. 21, 2002

(65) Prior Publication Data

US 2003/0160577 A1 Aug. 28, 2003

(30) Foreign Application Priority Data

May 16, 2001 (JP) .................................. 2001-146208

(51) Int. Cl.⁷ .............................................. H05B 37/02
(52) U.S. Cl. .................. 315/291; 315/209 R; 315/224; 315/DIG. 7
(58) Field of Search ................................. 315/291, 297, 315/308, 302, 307, 313, 209 R, 224, 244, DIG. 7, DIG. 5; H05B 37/02

(56) References Cited

U.S. PATENT DOCUMENTS 5,463,281 A * 10/1995 Linssen .................. 315/209 R
5,608,294 A 3/1997 Derra et al.
6,548,963 B2 * 4/2003 Van Casteren et al. . 315/209 R

FOREIGN PATENT DOCUMENTS

| EP | 0 917 180 | 5/1999 |
| JP | Sho59-46497 | 3/1984 |
| JP | 4-32198 | 2/1992 |
| JP | 4-342991 | 11/1992 |
| JP | 7-22886 | 1/1995 |
| JP | 9-153343 | 6/1997 |
| JP | 2001-66699 | 3/2001 |
| JP | 2002-110392 | 4/2002 |

* cited by examiner

Primary Examiner—Don Wong
Assistant Examiner—Trinh Vo Dinh
(74) Attorney, Agent, or Firm—Merchant & Gould P.C.

(57) ABSTRACT

A discharge-lamp lighting device is provided which decreases arc jumps, suppresses the fluctuation in brightness of the lamp, and prolongs a life of the lamp, by positively accelerating growth of spots even when an inexpensive, small and highly efficient lamp is used. A discharge-lamp controlling portion (101) sets frequencies of drive-controlling signals (A and B) for drive-controlling a commutator (109) within a predetermined frequency range so that spots formed by arc discharge on electrodes composing a high-pressure discharge lamp grow through a cycle of oxidation-reduction of a metal composing the electrodes, and superimposes a triangular wave signal generated on the basis of the drive-controlling signals onto a current-controlling signal (F) over an entire period of the drive-controlling signals so as to make a peak value of the triangular wave constant, thereby adjusting the waveform of current flowing in the high-pressure discharge lamp.

9 Claims, 10 Drawing Sheets

DISCHARGE LAMP LIGHTING DEVICE AND SYSTEM COMPRISING IT

TECHNICAL FIELD

The present invention relates to a discharge-lamp lighting device for lighting a discharge lamp such as a metal halide lamp, and a system such as a liquid crystal projector using the discharge-lamp lighting device.

BACKGROUND ART

Recently, the brightness of projection-type liquid crystal projectors has been improved dramatically by the use of highly efficient high-pressure discharge lamps (hereinafter, may be abbreviated as 'lamp(s)'). However, fluctuation in brightness on a screen, which is caused by a fluctuation of an arc track of a lamp, or a phenomenon called 'arc jump', has been remarkable. A problem associated with this type of lamp is that the discharge arc becomes unstable depending on the temperature of the electrode and the condition of the surface of the electrode. As explained in U.S. Pat. No. 5,608,294, the discharge arc becomes unstable because the origin of the discharge arc jumps to some sharp-pointed projections (hereinafter, referred to as 'spot(s)') formed on the surface of the electrode.

The above-identified U.S. Pat. No. 5,608,294 discloses a method for solving the arc jump caused by the above factors. As shown in FIGS. 8 and 9, the method includes generating, by using either a bistable multivibrator or a flip-flop, a current pulse Pc in a predetermined fraction of given half periods of the lamp current, supplying a lamp current I obtained by superimposing a homopolar current to a back porch part of an alternating current waveform at a ratio of 0.05-0.15 to the half periods with an amount of current corresponding to 5–15% of the energy supplied to the lamp.

An effect of this method is the prevention of arc jump, which is obtained by preheating the electrode which was an origin of the arc at the time of a polarity inversion of the lamp current with a previous current pulse before the surface temperature of the electrode is lowered, so that a returning point of the arc after the polarity inversion matches with the previous origin of the arc. However, this method alone is insufficient to prevent the arc jump since the method does not addresses some problems including: spot formation that is caused by tungsten halide oxide and that have been remarkable in the recent trend of highly efficient lamps, lowering temperature of the electrode surface caused by the polarity inversion time, furthermore, matters of heat capacity of the lamp electrodes and bulb shapes, aging of the lamp, and a new method of controlling switching power fed to an identical lamp.

A problem concerning the lamp lighting is that, depending on the temperature and a surface condition of the electrode, the discharge arc becomes unstable. As described in U.S. Pat. No. 5,608,294, the instability of the discharge arc tube is caused by jumping of the origin of the discharge arc to some spots formed on the surface of the electrode. The arc jumps occur at the time of the polarity inversion of the lamp current. The reason is that the lamp current is zero-crossed inevitably at the moment of the polarity inversion of the lamp current, whereby a considerable lowering of the electrode surface temperature through the entire periods of the lamp current results.

For lighting a lamp, glow discharge is carried out by applying a high-voltage pulse between the electrodes in order to warm the electrodes gradually, and subsequently, the operation shifts to discharge thermoelectrons, so that the arc will discharge continuously. At that time, the arc origin tends to discharge electrons by selecting electrode spots on the electrode surface, since more electrons will spring out from such spots. The spots are formed, since a metal such as tungsten used as a material of the electrodes is heated to approximately the melting point during the lighting of the lamp, on places where electrons impinge to cause sputtering of the electrode and to deform the electrode slightly.

Moreover, since lamps have bulbs of small diameters in the recent trend for highly efficient lamps, the arc and the quartz glass forming the bulb get much closer to each other. As a result, halogenated tungsten combined with a halide filled in the bulb will be coupled easily with oxygen as a component of the quartz glass, increasing the generation of tungsten halide oxide. The tungsten, which is evaporated and combined with a halogen, is combined also with oxygen substances such as oxides adhering to a molybdenum foil or the like that composes a conductor of the electrodes, thereby forming tungsten halide oxide. Furthermore, since the tungsten halide oxide tends to be separated at a part with a comparatively high temperature, the evaporated tungsten that has been reduced at a part with a comparatively low temperature among the entire electrodes, is reduced intensively at spots as origins of arc at the tips of the electrodes, and further accelerates the growth of the spots.

The grown spot is spattered by an inrush current at the next lighting of the lamp, and thus, many small spots are formed on the electrode surface. While the lamp is lighting, fluctuation of the arc origin is generated on the electrode surface at some parts at which the tungsten halide oxide is reduced, thereby forming many spots. Considering this, the origins of discharge arc can be fixed and stabilized by decreasing considerably the number of the electrode spots and maintaining the fewer spots to have a sharp-pointed shape, where only one of the spots has a high temperature.

DISCLOSURE OF INVENTION

The present invention aims to solve the above-described problems, and an object thereof is to provide a discharge-lamp lighting device with fewer arc jumps and less fluctuation in brightness of a lamp even when an inexpensive, small and highly efficient lamp is used. This object can be achieved by accelerating positively the growth of spots. And a lamp of the present invention has a long life. The present invention provides also a system such as a liquid crystal projector using the discharge-lamp lighting device.

For achieving the above-described objects, a discharge-lamp lighting device according to the present invention comprises: a DC-DC converter for stepping down an input DC voltage in accordance with a current-controlling signal and outputting a desired current; a commutator for commutating a direct current from the DC-DC converter to an alternating current in accordance with a drive-controlling signal with a rectangular waveform; a high-pressure discharge lamp to be fed with the alternating current from the commutator; and a controlling portion for outputting the drive-controlling signal and also for outputting the current-controlling signal on the basis of a value of current flowing in the high-pressure discharge lamp or a value of voltage of the high-pressure discharge lamp in order to make electric energy in the high-pressure discharge lamp constant. The controlling portion sets a frequency of the drive-controlling signal to be within a predetermined frequency range so that sharp-pointed projections (spots) formed by an arc discharge on electrodes composing the high-pressure discharge lamp grow through a cycle of oxidation-reduction of a metal composing the electrode, superimposes a triangular wave signal generated on the basis of the drive-controlling signal onto the current-controlling signal through the entire periods of the drive-controlling signal in order to make a peak value of the current flowing in the high-pressure discharge lamp constant, and adjusts a waveform of the current flowing in the high-pressure discharge lamp.

According to this configuration, the polarity inversion frequency of the lamp current as a frequency of the drive-controlling signal is set to a frequency (e.g., 170 Hz) allowing growth of the spots and the waveform of the current amount can be adjusted to have a constant peak value of the back porch of the lamp current. Thereby, it is possible to preheat gradually the origin of the arc just before polarity inversion of the lamp current, suppress lowering of the electrode surface temperature at the time of polarity inversion, and then warm rapidly the arc origin of an opposite electrode soon after the polarity inversion. Therefore, a long life of the lamp can be realized by minimizing the fluctuation in temperature of the electrodes before and after the polarity inversion and accelerating growth with certain spots of high temperature.

That is, by accelerating the growth of certain spots and by decreasing a change in temperature at the arc's origin and returning point at the time of polarity inversion of the lamp current, the spots with high temperature on the electrode surface can be fixed to avoid arc jumps. Furthermore, since one effect of the adjustment of the lamp current also can yield expectations of a long life of the lamp electrodes in that the electrode temperature during a discharge is apparently suppressed to be substantially constant while the current amount of the lamp varies, the obtained effect of decreasing the arc jump is superior to that reported in U.S. Pat. No. 5,608,294.

In the discharge-lamp lighting device according to the present invention, it is preferable that the controlling portion changes the triangular wave signal in at least one of the amount and the timing for superimposing onto the current-controlling signal in accordance with either the current value or the voltage value of the lamp.

A consideration of this structure is that substantially all the discharge-lamp lighting devices are controlled to provide a constant power to the lamp and furthermore, the voltage between the electrodes of the lamp is raised with use of the lamp. Namely, the lamp current will be decreased with aging of the lamp.

Specifically, the lamp current is decreased and the electrode temperature stops a remarkable rising over the working time of the lamp, and it will be difficult to discriminate discharging spots and non-discharging spots based on the temperature difference. Occurrence of arc jumps caused by aging of the lamp can be prevented if it is possible to adjust the amount and timing for superimposing the triangular wave signal onto the current-controlling signal inputted into the DC-DC converter in accordance with either the current or voltage of the lamp. For example, when the lamp current is decreased and the electrode temperature is not raised remarkably due to the change in the lamp voltage over time, occurrence of arc jumps can be prevented by increasing the amount of superimposing triangular wave signal and widening intentionally the temperature difference between discharging spots and non-discharging spots.

In the discharge-lamp lighting device according to the present invention, it is also preferable that the controlling portion changes at least one of the amount and the timing for superimposing the triangular wave signal onto the current-controlling signal in accordance with the temperature of the high-pressure discharge lamp.

This structure serves to prevent arc jumps that occur when the temperature difference between discharging spots and non-discharging spots is decreased due to variation in heat capacities of the lamps, specifically, differences in electrode structures and diameters, lamp bulb diameters, and cooling conditions of the lamps, or the environmental temperatures in use of the lamp. For example, when the working temperature of the lamp is low and the temperature of the lamp electrode is not raised sufficiently, superimposition of triangular wave signals can be increased and the temperature difference between discharging spots and non-discharging spots can be widened intentionally so as to prevent arc jumps.

In the discharge-lamp lighting device according to the present invention, it is preferable that the controlling portion sets the frequency of the drive-controlling signal variably corresponding to either the current value or the voltage value of the lamp. In this case, it is preferable that the controlling portion sets the frequency of the drive-controlling signal to be higher (e.g., 340 Hz) than a predetermined frequency range when the lamp current value is equal to or higher than a predetermined value or when the lamp voltage value is equal to or lower than a predetermined value. Alternatively, it is preferable that the controlling portion inhibits superimposition of the triangular wave signal onto the current-controlling signal when the lamp current value is equal to or higher than a predetermined value or when the lamp voltage value is equal to or lower than a predetermined value.

According to this configuration, arc jumps can be decreased and the life of the lamp can be prolonged by suppressing and accelerating growth of spots caused by the tungsten halide oxide as circumstances demand, since the reduction of tungsten halide oxide requires an appropriate range for temperatures and a certain period of time. Therefore, controlling the frequency of the commutator by using either the lamp current or voltage can serve to control intentionally the amount of reduction of the tungsten halide oxide, i.e., the growth of spots.

For example, when the lamp voltage is low and much lamp current flows, the surface temperature of the electrodes also will be raised in general so as to provide a condition to accelerate the growth of the spots that is caused by reduction of the tungsten halide oxide. In this case, by shifting the frequency for driving the commutator to a higher value, the time for reducing the tungsten halide oxide can be shortened to suppress growth of the spots. This can be attained also by inhibiting superimposition of the triangular wave signal onto the current-controlling signal. Thereby, losses at switching elements composing the commutator can be decreased to prevent thermal destruction of the switching elements.

On the contrary, when the lamp voltage is high and less lamp current flows, the surface temperature of the electrodes is low as well, and thus, the spots caused by reduction of the tungsten halide oxide will be difficult to grow. In this case, by shifting the frequency for driving the commutator to a lower value, the time for reducing the tungsten halide oxide can be prolonged to accelerate the spots' growth. This can be attained also by resuming the superimposition of the triangular wave signal onto the current-controlling signal.

An additional effect provided is to decrease the lowering of the lamp voltage caused by the growth of spots that shortens the distance between the electrodes, which is obtained by suppressing excessive growth of the spots when the lamp voltage is low. Moreover, since discharging spots can be made to grow intensively when the lamp voltage is high, arc jumps can be prevented, the distance between electrodes is shortened due to the growth of spots, and thus the lamp voltage can be lowered intentionally. That is, since a change in the lamp voltage over time can be decreased, the arc jumps can be decreased and also, the lamp life can be prolonged.

In the discharge-lamp lighting device according to the present invention, it is also preferable that the controlling portion sets the frequency of the drive-controlling signal variably corresponding to the temperature of the high-pressure discharge lamp.

According to this configuration, the arc jumps can be decreased and a lamp life can be prolonged by suppressing and accelerating growth of spots caused by the tungsten halide oxide as circumstances demand, since the reduction of tungsten halide oxide requires an appropriate range for temperatures and a certain period of time.

Therefore, if the frequency of the commutator can be controlled depending on the lamp working temperature, it will be possible to control intentionally the amount of reduction of the tungsten halide oxide, i.e., the growth of spots. For example, when the lamp temperature is high, the surface temperature of the electrode is also raised in general so as to provide a condition to accelerate the growth of the spots that is caused by reduction of the tungsten halide oxide. In this case, by shifting the frequency for driving the commutator to a higher value, the time for reducing the tungsten halide oxide is shortened, thereby suppressing growth of the spots.

On the contrary, when the lamp temperature is low, the surface temperature of the electrode is low as well, and thus the spots caused by reduction of the tungsten halide oxide will be difficult to grow. In this case, the time for reducing the tungsten halide oxide is prolonged by shifting the frequency for driving the commutator to a lower value, thereby accelerating growth of the spots.

An additional effect provided is to decrease the lowering of the lamp voltage caused by the growth of spots that shortens the distance between the electrodes, which is obtained by suppressing excessive growth of the spots when the lamp temperature is high. Moreover, since discharging spots can be made to grow intensively when the lamp temperature is low, arc jumps can be prevented, the distance between electrodes is shortened due to the growth of spots, and thus the lamp voltage can be lowered intentionally. That is, since a change in the lamp voltage over time can be decreased, the arc jumps can be decreased and also, the lamp life can be prolonged.

In the discharge-lamp lighting device according to the present invention, it is preferable that the predetermined frequency range is from 100 Hz to 270 Hz, and the controlling portion adjusts the waveform so that the time for the polarity inversion of the current flowing in the high-pressure discharge lamp is at most 40 $\mu$sec in a 80% section of the rated current.

According to this configuration, the arc jumps can be decreased by shortening time in which the temperature of the electrode surface is low during the polarity inversion and also by matching the returning point of the arc after the polarity inversion with the origin of the previous arc. The frequency range for the sharp-pointed projections (spots) to grow will be specified as follows. When the frequency of the drive-controlling signal becomes lower than the lower limit of 100 Hz, the spots are destroyed due to impact at the time of polarity inversion of the lamp current. When the frequency of the drive-controlling signal becomes higher than the upper limit of 270 Hz and when the lamp electrode used is made of tungsten, the time for reduction of the tungsten halide oxide is shortened and growth of the spots is suppressed. For this reason, the frequency for the spots to grow is set to a range of 100 Hz to 270 Hz.

It is preferable that the discharge-lamp lighting device is provided with a choke coil connected in series with the high-pressure discharge lamp and having an inductance value that is higher in a high frequency region than in a low frequency region.

According to this configuration, polarity inversion can be performed instantly by using positively a back electromotive force generated at the choke coil at the time of the polarity inversion. In general, for controlling the commutator that commutates a direct current to an alternating current, a dead time is provided so that a switching element at the high side and a switching element at the low side will not turn ON simultaneously.

This dead time ranges from several $\mu$sec to tens of $\mu$sec, since it is set by considering an on-delay time and a rise time, and also an off-delay time and a fall time of the switching elements. Since the capacity of the switching elements is increased for a case of a high-power type lamp, the dead time will be increased further. In such a case, the temperature of the electrodes is lowered excessively during the dead time, and the discharge arc shifts to other spots so as to cause arc jumps.

A choke coil is inserted in series with the lamp in order to generate a back electromotive force for the choke coil to maintain the magnetic flux at the moment that the lamp current is interrupted during the polarity inversion of the lamp current, so that a current flows in the inverse direction. By using this positively, the time for the polarity inversion can be shortened, which cannot be obtained by only controlling the commutator. In some discharge-lamp lighting devices, a choke coil such as an air-core type or an open-magnetic circuit type having a large inductance value at a high frequency region is used. However, a choke coil L1 used in the present invention is limited to a close-magnetic circuit type such as a toroidal type having a large inductance value in a low frequency region.

For achieving the above-identified objects, a first system according to the present invention using the above-described discharge-lamp lighting device according to the present invention is characterized in that it includes at least a cooling device for cooling the high-pressure discharge lamp, a brightness detector for detecting brightness of the high-pressure discharge lamp, and a controlling device for decreasing the cooling capacity of the cooling device when brightness fluctuation is detected by the brightness detector.

According to this configuration, since shapes or the like of the spots formed on the lamp electrode surface vary depending on the lamp temperature as well, when detecting the fluctuation in brightness of the lamp, the arc jumps can be decreased by decreasing the cooling capacity of the cooling device so as to accelerate the growth of the spots. The brightness detector can be omitted in case a correlation to cause arc jumps has been established between a working environmental temperature of an apparatus such as a liquid crystal projector equipped with a discharge lamp and a separate component temperature inside the apparatus.

For achieving the above-described objects, a second system according to the present invention using a discharge-lamp lighting device according to the present invention, is characterized in that it includes at least a cooling device for cooling a high-pressure discharge lamp, a temperature detector for detecting the external temperature of the system, and a controlling device for setting the cooling capacity of the cooling device at a predetermined value when the external temperature detected by the temperature detector becomes lower than a predetermined value.

According to this configuration, when a correlation to cause arc jumps is established between the working environmental temperature of the apparatus equipped with the discharge-lamp lighting device and a separate component temperature inside the apparatus, and when a brightness detector for detecting brightness fluctuation of the lamp is omitted, a cooling condition of a cooling device equipped to the exterior for cooling the lamp is set previously to a controlling device of an apparatus such as a liquid crystal projector equipped with the discharge-lamp lighting device. Accordingly, when the external temperature becomes lower than a predetermined value (e.g., 10° C.), the cooling capacity of the cooling device is set to a predetermined condition in order to accelerate the growth of the spots, so that the arc jumps can be decreased.

PREFERRED EMBODIMENTS OF THE INVENTION

Preferred embodiments of the present invention will be described below, referring to the attached drawings.

(First Embodiment)

Figure 1:
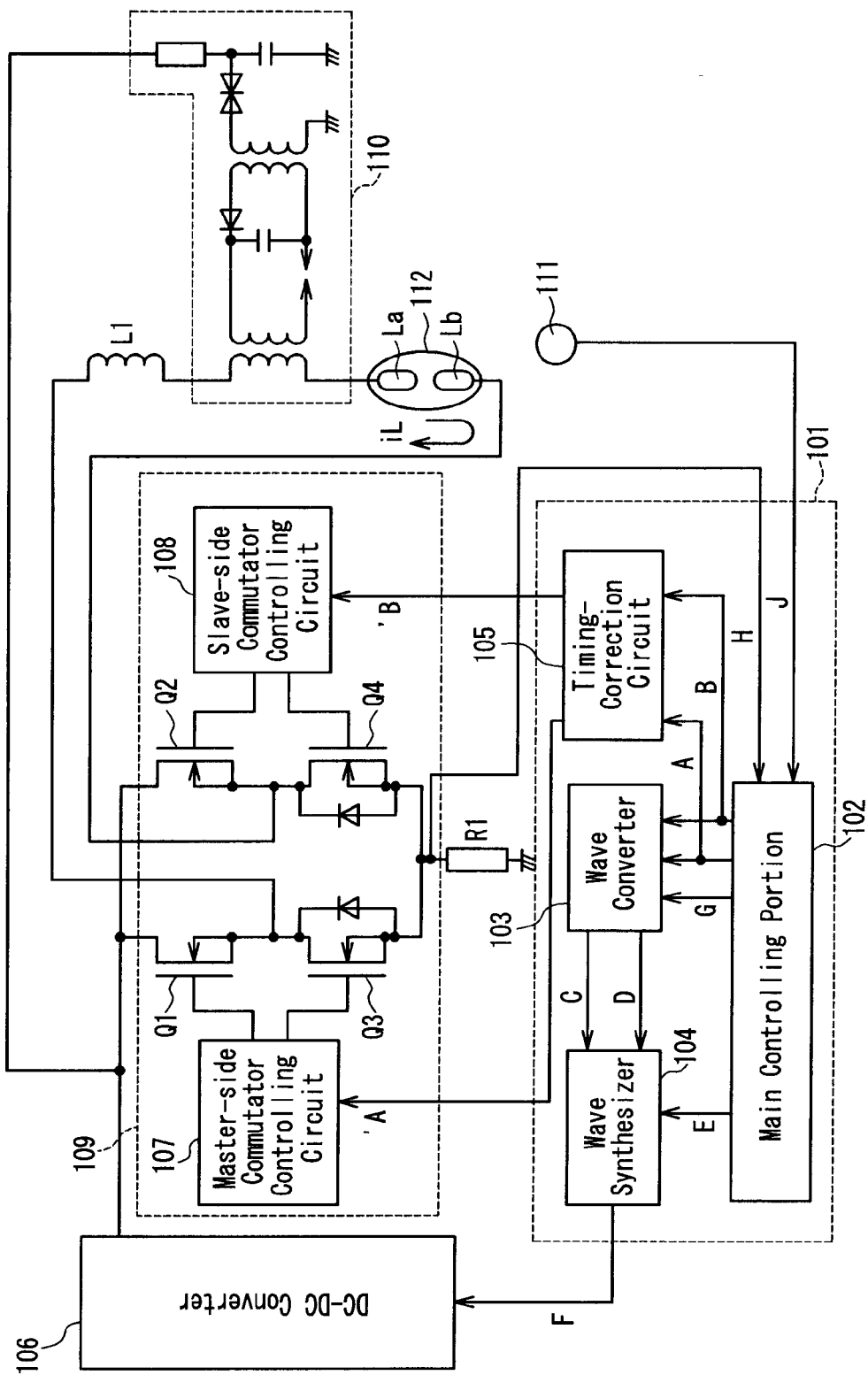
FIG. 1 is a circuit block diagram showing a structural example of a discharge-lamp lighting device according to each embodiment of the present invention.

FIG. 1 is a circuit block diagram showing a structural example of a discharge-lamp lighting device according to a first embodiment of the present invention. The structure shown in FIG. 1 is applied also to each of the following embodiments. The discharge-lamp lighting device is composed of a discharge-lamp controlling portion 101 (controlling portion), a DC-DC converter 106 for outputting a desired current corresponding to a current-controlling signal F from the discharge-lamp controlling portion 101, a commutator 109 for converting a direct current from the DC-DC converter 106 into an alternating current, a high-voltage generating portion 110 for lighting a lamp, a lamp temperature detector or a brightness detector 111, a lamp 112, a current detector (a current detecting resistor) R1 for detecting a current flowing in the lamp 112, and a choke coil L1.

The commutator 109 is composed of a full-bridge circuit or the like including switching elements Q1, Q2, Q3, Q4, a master-side commutator controlling circuit 107, and a slave-side commutator controlling circuit 108.

Figure 2:
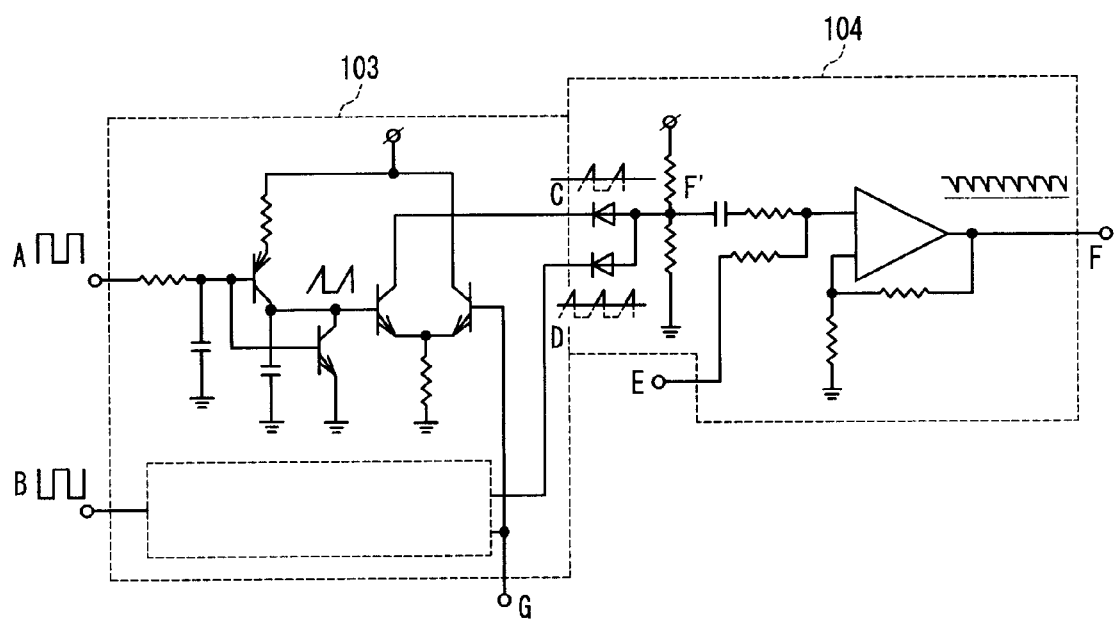
FIG. 2 is a circuit diagram specifically showing internal structures of the waveform converter 103 and the waveform synthesizer 104 shown in FIG. 1.

The discharge-lamp controlling portion 101 is composed of a main controlling portion 102, a waveform converter 103, a waveform synthesizer 104, and a timing correction circuit 105. FIG. 2 shows a specific structure of internal circuits of the waveform converter 103 and the waveform synthesizer 104.

Next, operations of the thus configured discharge-lamp lighting device will be described below referring to FIGS. 1 and 2 as well as FIG. 3 that shows waveforms.

Figure 3:
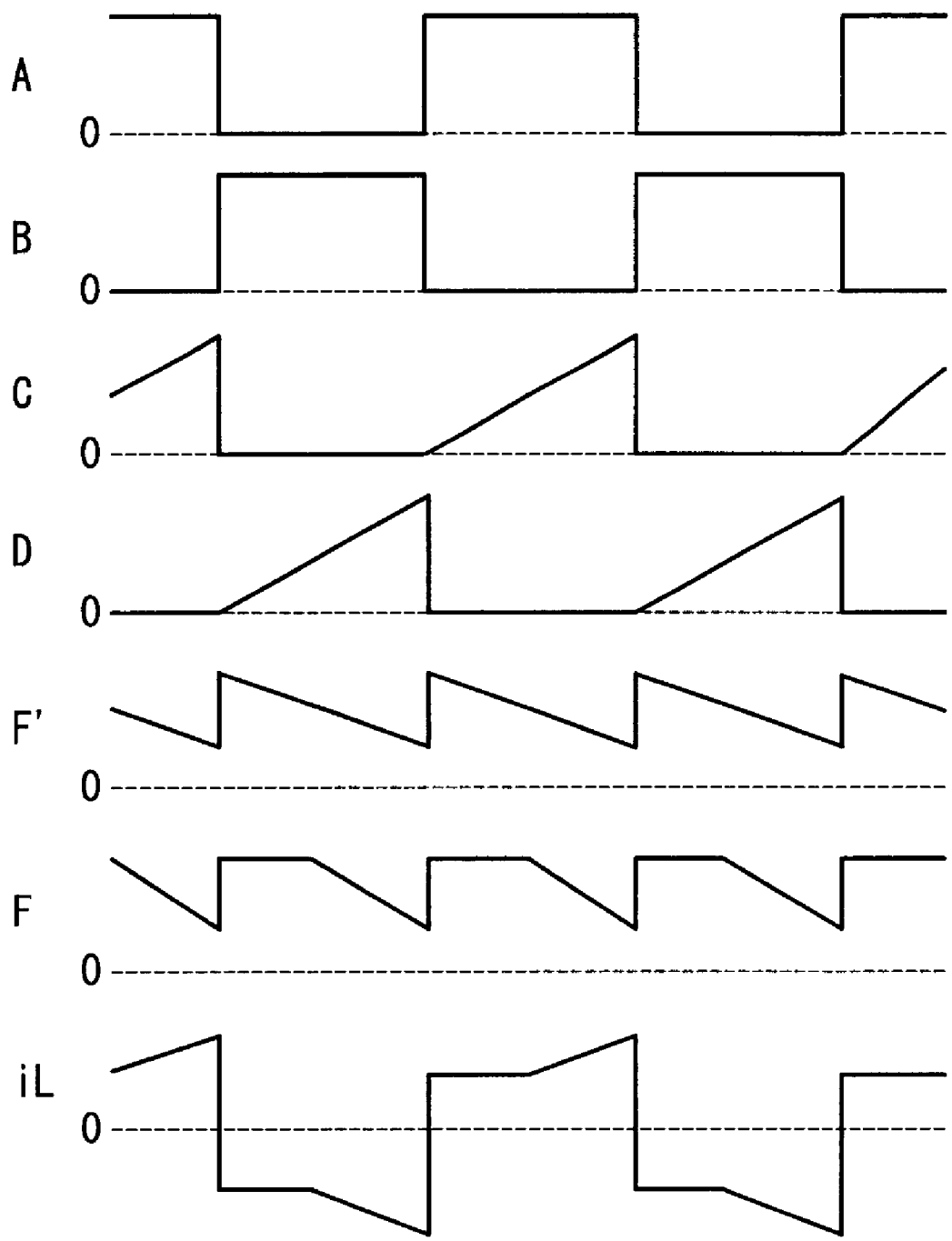
FIG. 3 shows waveforms of signals at respective portions in FIG. 1.

First, a master-side commutator controlling signal A and a slave-side commutator controlling signal B that are generated at the main controlling portion 102 of the discharge-lamp controlling portion 101 in order to drive-control the commutator 109 (the controlling signals A and B may be called 'drive-controlling signals') are sent to the waveform converter 103 and converted to triangular wave signals (single-sided triangular wave signals) C, D as illustrated in FIG. 3. In FIGS. 2 and 3, the triangular wave signals C and D are shown as current signals drawn from a power supply. As shown in FIG. 2, the waveform converter 103 has an inputting portion composed of a well-known integrator or the like and an outputting portion composed of an op-amp or the like. This structure enables free setting of amplifier gain, and inclinations and amplitudes of the waveforms of the triangular wave signals C and D having waveforms converted by the waveform converter 103 can be set freely. Moreover, a superimposition amount/timing adjustment signal G (DC level signal) is inputted from the main controlling portion 102 to the waveform converter 103 so as to adjust the amount and timing for superimposing the triangular wave signal.

Next, the triangular wave signals C and D whose waveforms have been converted by the waveform converter 103 are inputted into the waveform synthesizer 104 together with a DC-DC converter controlling signal E (a voltage-controlling signal) generated by the main controlling portion 102. First at the waveform synthesizer 104, the triangular wave signals C and D flow as current signals to cause a voltage drop, and thus a triangular wave synthesizing signal F' shown in FIG. 3 is obtained. Next, the triangular wave synthesizing signal F' is superimposed onto the DC-DC converter controlling signal E so as to form a current-controlling signal F of the DC-DC converter 106 as shown in FIG. 3 and adjust the waveform of the lamp current iL.

The timing correction circuit 105 is composed of a buffer circuit or the like, and it generates a timing correction signal A' of the master-side commutator controlling signal inputted into the master-side commutator controlling circuit 107 and a timing correction signal B' of the slave-side commutator controlling signal inputted into the slave-side commutator controlling circuit 108 in order to match the timing of the current-controlling signal F of the DC-DC convert 106 with the master-side commutator controlling signal A and the slave-side commutator controlling signal B both for drive-controlling the commutator 109. The timing correction circuit 105 can be omitted in case there is no need of the timing correction, which can be determined experimentally.

The frequency of the drive-controlling signal is set to be a frequency (e.g., 170 Hz) within a predetermined frequency range (100 Hz to 270 Hz) so that spots (sharp-pointed projections) formed on the electrodes La, Lb of the lamp 112 by arc discharge grow through a cycle of ionization, halogenation, oxidation, and reduction of such tungsten as a metal composing the electrodes La and Lb.

As described above, according to this embodiment, a polarity inversion frequency of a lamp current as a frequency of the drive-controlling signal is set to allow spots to glow, and a waveform of current amount with a constant peak value of a back porch of the lamp current can be adjusted, thereby origins of the arc is preheated gradually just before polarity inversion of the lamp current, lowering of the electrode surface temperature is suppressed at the time of the polarity inversion, and subsequently an arc origin of an opposite electrode can be warmed rapidly just after the polarity inversion. Thereby, a long life of the lamp can be realized by minimizing the temperature fluctuation of the electrodes before and after the polarity inversion and accelerating growth of certain spots with high temperature.

(Second Embodiment)

A second embodiment of the present invention will be described below by referring to FIG. 1 as well. In this embodiment, an amount and timing for superimposing a triangular wave signal onto the current-controlling signal is set variably on the basis of a detected lamp current.

It has been mentioned in the first embodiment that a superimposition amount/timing adjustment signal G (DC level signal) is inputted from the main controlling portion 102 to the waveform converter 103 so as to adjust the amount and timing of superimposing the triangular wave signal. The lamp current iL commutated at the commutator 109 is detected by the current detector R1, and fed back as a lamp current detection signal H into the main controlling portion 102. At the main controlling portion 102, a superimposition amount/timing adjustment signal G is generated according to the amount of feedback of the lamp current detection signal H, and thus the amount and timing for superimposing the triangular wave signal at the waveform converter 103 is adjusted.

All of the above-described elements can be composed of analog circuits as well. When the main controlling portion 102 is equipped with a microcomputer, it is also possible to store in a memory of the microcomputer DC level setting values for setting an amount and timing for superimposing the triangular wave signal at the waveform converter 103 with respect to the respective current values, read out the DC level setting value in accordance with a feedback amount of the lamp current detection signal H and set a superimposition amount/timing of the triangular wave signal with respect to the waveform converter 103.

As mentioned above, according to this embodiment, the occurrence of arc jumps due to aging of the lamp 112 can be prevented by enabling adjustment of an amount and timing for superimposing a triangular wave signal onto the current-controlling signal F inputted into the DC-DC converter 106 in accordance with either a current amount fed to the lamp 112 or an amount of the applied voltage. For example, when the lamp current iL is decreased due to change of the lamp voltage over time and the increase in the electrode temperature slows down, the occurrence of arc jumps can be prevented by increasing the amount of superimposition of the triangular wave signal and intentionally widening the temperature difference between discharging spots and non-discharging spots.

(Third Embodiment)

A third embodiment of the present invention will be described below by referring to FIG. 1 as well. In this embodiment, an amount and timing for superimposing the triangular wave signal onto the current-controlling signal is set variably on the basis of a lamp temperature detected by the lamp temperature detector 111.

It has been mentioned in the first embodiment that a superimposition amount/timing adjustment signal G (DC level signal) is inputted from the main controlling portion 102 to the waveform converter 103 so as to adjust the amount and timing of superimposing the triangular wave signal. The lamp temperature detected by the lamp temperature detector 111 is fed back as a temperature detection signal J to the main controlling portion 102. At the main controlling portion 102, a superimposition amount/timing adjustment signal G is generated according to a feedback mount of the temperature detection signal J so as to adjust the amount and timing of superimposing the triangular wave signal at the waveform converter 103.

All of the above-described elements can be composed of analog circuits as well. When the main controlling portion 102 is equipped with a microcomputer, it is possible to store in a memory of the microcomputer DC level setting values for setting an amount and timing of superimposing a triangular wave signal at the waveform converter 103 with respect to the temperature detection values of the respective lamps 112, read out the DC level setting value in accordance with a feedback amount of the temperature detection signal J from the lamp temperature detector 111, thereby setting an amount/timing for superimposing the triangular wave signal with respect to the waveform converter 103.

As mentioned above, this embodiment serves to prevent arc jumps that occur when a temperature difference between discharging spots and non-discharging spots is decreased because of a difference in heat capacities among lamps, specifically, differences in structures or thickness of electrodes, or difference in lamp bulb diameters, difference in cooling conditions for the lamps, and difference in environmental temperatures of lamps in use. For example, when the working temperature of the lamp is low and the temperature of the lamp electrode does not rise sufficiently, arc jumps can be prevented by increasing superimposing triangular wave signals and intentionally widening the temperature difference between discharging spots and non-discharging spots.

(Fourth Embodiment)

A fourth embodiment of the present invention will be described below by referring to FIG. 1 as well. In this embodiment, the frequencies of drive-controlling signals are set variably based on the lamp current detected by the current detector R1.

As described above, drive-controlling signals, i.e., a master-side commutator controlling signal A and a slave-side commutator controlling signal B for controlling the commutator 109, are generated at the main controlling portion 102 of the discharge-lamp controlling portion 101. The lamp current iL commutated at the commutator 109 is detected by the current detector R1, and fed back as a lamp current detection signal H to the main controlling portion 102. At the main controlling portion 102, the control frequencies of the master-side commutator controlling signal A and the slave-side commutator controlling signal B for controlling the commutator 109 can be changed in accordance with the feedback amount of the lamp current detection signal H. In this case, the main controlling portion 102 sets a frequency of the drive-controlling signal to be from, e.g., 170 Hz to a value higher than a predetermined frequency range (from 100 Hz to 270 Hz), e.g., 340 Hz when the value of the lamp current is equal to or higher than a predetermined value (or when the value of the lamp voltage is equal to or lower than a predetermined value). Alternatively, the main controlling portion 102 inhibits superimposition of the triangular wave signal onto the current-controlling signal when the lamp current value is equal to or higher than a predetermined value (or when the value of the lamp voltage is equal to or lower than a predetermined value).

All of the above-described elements can be composed of analog circuits as well. When the main controlling portion 102 is equipped with a microcomputer, it is possible to store, in a memory of the microcomputer, frequency data of a drive-controlling signal to the commutator 109 with respect to the respective current value and read out the frequency data of the drive-controlling signal in accordance with a feedback amount of the lamp current detection signal H so as to allow a change of the frequency of the drive-controlling signal to the commutator 109.

As described above, according to this embodiment, arc jumps can be decreased and the life of the lamp can be prolonged by suppressing and accelerating growth of spots caused by the tungsten halide oxide as circumstances demand, since reduction of tungsten halide oxide requires an appropriate range for temperatures and a certain period of time. Therefore, the amount of reduction of the tungsten halide oxide, i.e., the growth of spots, can be controlled intentionally, by controlling the frequency of the drive-controlling signal to the commutator 109 by either a lamp current or a lamp voltage.

For example, when the lamp voltage is low and much lamp current flows, the surface temperature of the electrodes also will be raised in general so as to provide a condition to accelerate the growth of the spots caused by reduction of the tungsten halide oxide. In this case, by shifting the frequency of the drive-controlling signal to the commutator 109 to a higher level, the time for reducing the tungsten halide oxide can be shortened to suppress growth of the spots. This can be attained also by inhibiting the superimposition of the triangular wave signal onto the current-controlling signal. Thereby, losses at the switching elements composing the commutator can be decreased to prevent thermal destruction of the switching elements.

On the contrary, when the lamp voltage is high and less lamp current flows, the surface temperature of the electrodes is low as well, and thus, the spots caused by reduction of the tungsten halide oxide will be difficult to grow. In this case, by shifting the frequency of the drive-controlling signal to the commutator 109 to a lower level, the time for reducing the tungsten halide oxide can be prolonged to accelerate the growth of the spots. This can be attained also by resuming the superimposition of the triangular wave signal onto the current-controlling signal.

An additional effect provided is to decrease the lowering of the lamp voltage caused by the growth of spots that shortens the distance between the electrodes, which is obtained by suppressing excessive growth of the spots when the lamp voltage is low. Moreover, since discharging spots can be made to grow intensively when the lamp voltage is high, arc jumps can be prevented, the distance between electrodes is shortened due to the growth of spots, and the lamp voltage can be lowered intentionally. That is, since the change in the lamp voltage over time can be decreased, the arc jumps can be decreased and also, the lamp life can be prolonged.

(Fifth Embodiment)

A fifth embodiment of the present invention will be described below by referring to FIG. 1 as well. In this embodiment, the frequencies of drive-controlling signals are set variably based on the lamp temperature detected by the lamp temperature detector 111.

As described above, drive-controlling signals, i.e., a master-side commutator controlling signal A and a slave-side commutator controlling signal B for controlling the commutator 109, are generated at the main controlling portion 102 of the discharge-lamp controlling portion 101. A temperature detection signal J detected by the lamp temperature detector 111 is fed back to the main controlling portion 102. At the main controlling portion 102, the controlling frequencies of the master-side commutator controlling signal A and the slave-side commutator controlling signal B for controlling the commutator 109 can be changed in accordance with the feedback amount of the temperature detection signal J.

All of the above-described elements can be composed of analog circuits as well. When the main controlling portion 102 is equipped with a microcomputer, it is possible to store, in a memory of the microcomputer, frequency data of the drive-controlling signal to the commutator 109 with respect to the temperature detection values of respective lamps and read out the frequency data of the drive-controlling signal in accordance with a feedback amount of the lamp temperature detection signal J so as to allow changing of the frequencies of the drive-controlling signals to the commutator 109. When the temperature of the lamp 112 is predictable to some degree based on experiments, the lamp temperature detector 111 can be omitted.

As described above, according to this embodiment, arc jumps can be decreased and the life of the lamp can be prolonged, which is obtained by suppressing and accelerating growth of spots caused by the tungsten halide oxide as circumstances demand, since reduction of tungsten halide oxide requires an appropriate range for temperatures and a certain period of time.

Therefore, if it is possible to control the frequencies of the drive-controlling signals to the commutator 109 by using the lamp working temperature, the amount of reduction of the tungsten halide oxide, i.e., the growth of spots, can be controlled intentionally. For example, when the lamp temperature is high, the surface temperature of the electrodes also will be raised in general so as to provide a condition to accelerate the growth of the spots caused by reduction of the tungsten halide oxide. In this case, by shifting the frequency of the drive-controlling signal to the commutator 109 to a higher level, the time for reducing the tungsten halide oxide can be shortened to suppress growth of the spots.

On the contrary, when the lamp temperature is low, the surface temperature of the electrodes is low as well, and thus, the spots caused by reduction of the tungsten halide oxide will be difficult to grow. In this case, the time for reducing the tungsten halide oxide can be prolonged to accelerate growth of the spots by shifting the frequency of the drive-controlling signal to the commutator 109 to a lower level.

An additional effect provided is to decrease lowering of the lamp voltage caused by the growth of spots that shortens the distance between the electrodes, which is obtained by suppressing excessive growth of the spots when the lamp temperature is high. Moreover, since discharging spots can be made to grow intensively when the lamp temperature is low, arc jumps can be prevented, the distance between electrodes is shortened due to the growth of spots, and thus the lamp voltage can be lowered intentionally. That is, since change in the lamp voltage over time can be decreased, the arc jumps can be decreased and also, the lamp life can be prolonged.

(Sixth Embodiment)

Figure 4:
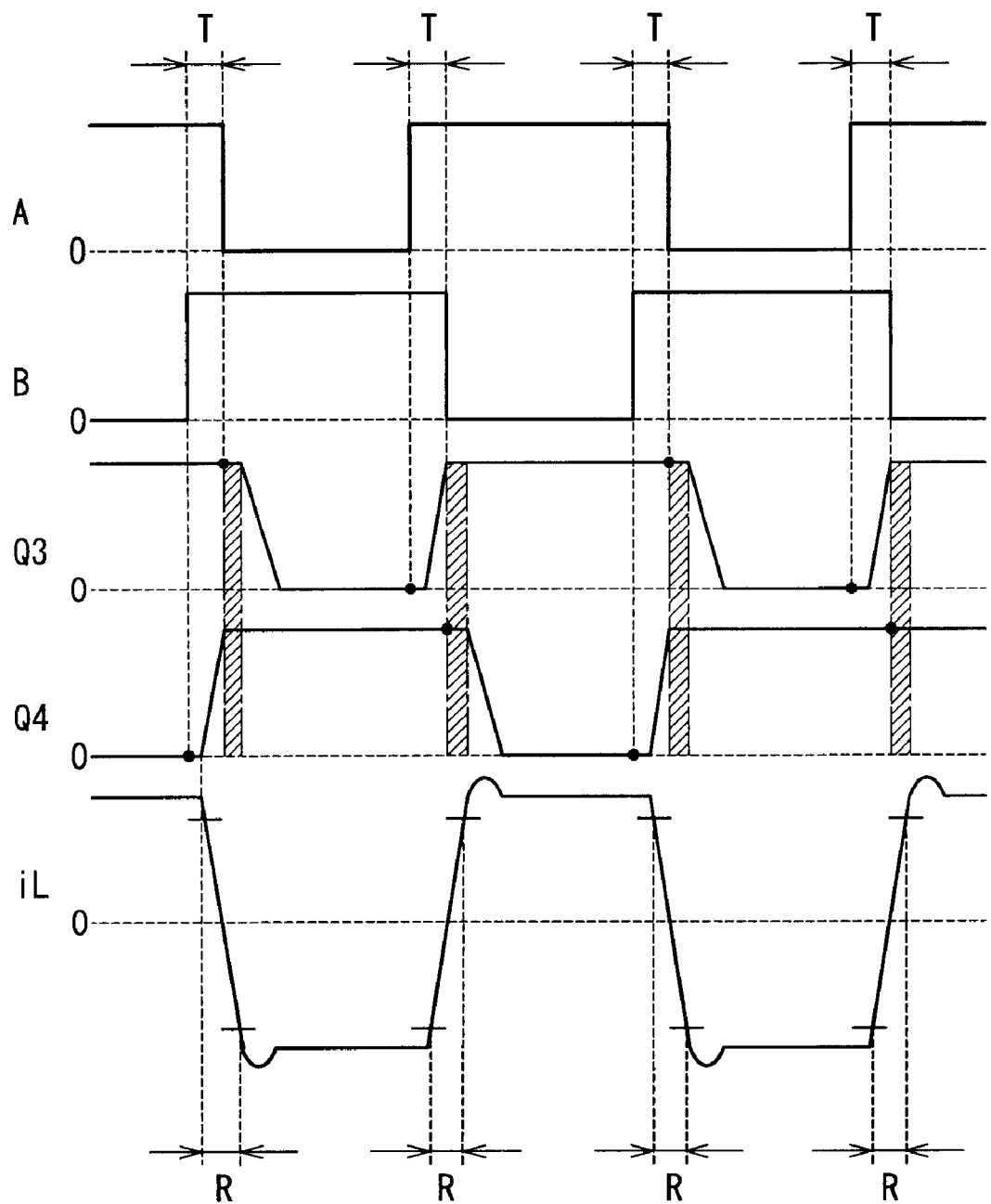
FIG. 4 shows waveforms of signals at respective portions in a sixth embodiment of the present invention.

A sixth embodiment of the present invention is described below by referring to FIG. 4 that shows waveforms in addition to FIG. 1. In this embodiment, the master-side commutator controlling signal A and the slave-side commutator controlling signal B are superimposed in a predetermined time section, and a back electromotive force provided by the choke coil L1 is used for shortening a polarity inversion time of the lamp current and solving the problem of lowering temperature at the electrodes La and Lb of the lamp 112.

As described above, drive-controlling signals, i.e., a master-side commutator controlling signal A and a slave-side commutator controlling signal B for controlling the commutator 109, are generated at the main controlling portion 102 of the discharge-lamp controlling portion 101. Regarding the timing for generating the master-side commutator controlling signal A and the slave-side commutator controlling signal B, as shown in FIG. 4, each back porch of the master-side commutator controlling signal A and each front porch of the slave-side commutator controlling signal B are superimposed by a period on the order of several $\mu$sec, while each front porch of the master-side commutator controlling signal A and each back porch of the slave-side commutator controlling signal B are superimposed by a period on the order of several $\mu$sec.

This superimposition time T is determined by considering an on-delay time and a rise time, and also an off-delay time and a fall time of the switching elements Q1, Q2, Q3, Q4 such as a MOS-FET, an IGBT (insulated gate type bipolar transistor) or a transistor that compose the commutator 109. Based on experiments, the superimposition time T is set so that the waveforms can be adjusted so that the polarity inversion time of the lamp current is at most 40 $\mu$sec in a 80% section R of the rated current. In this case, since the superimposition time T can be set both positively and negatively, substantially all the circuit conditions can be covered.

All of the above-described elements can be composed of analog circuits as well. Alternatively, when the main controlling portion 102 is equipped with a microcomputer, it is possible to store in a memory of the microcomputer an optimum superimposition time T for controlling the respective switching elements Q1, Q2, Q3 and Q4 in order to allow change in accordance with characteristics of the used components.

Figure 5:
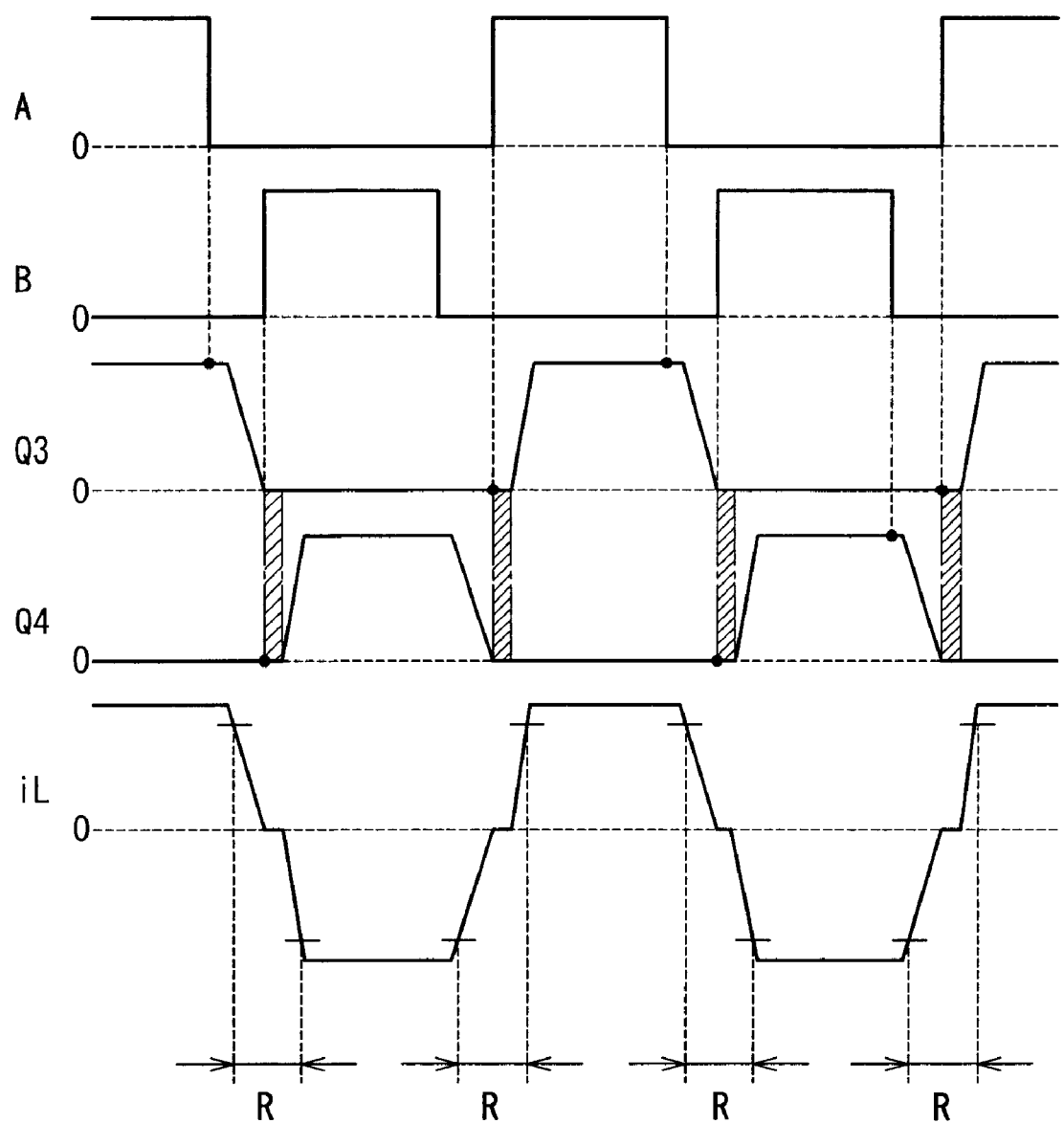
FIG. 5 shows waveforms of signals of respective portions in conventional technology that is not composed as in the sixth embodiment.

Furthermore, as shown in FIG. 1, a similar effect can be obtained in shortening the polarity inversion time, by inserting a choke coil L1 in series with the lamp 112, and by positively using a back electromotive force generated at the choke coil L1 during the polarity inversion in order to enable an instant polarity inversion. This is based on a concept of positively using a phenomenon that this choke coil L1 generates a back electromotive force for maintaining a magnetic flux at the moment that the lamp current is interrupted during the polarity inversion of the lamp current, and that a current flows in the opposite direction. In a comparison with the conventional method shown in FIG. 5, shortening of the polarity inversion time R, which is not obtainable only by controlling the commutator 109, can be realized. Similarly in this case, the inductance value of the choke coil L1 will be set in accordance with characteristics of the used components so as to perform waveform adjustment so that the polarity inversion time R of the lamp current is at most 40 $\mu$sec in a 80% section of the rated current.

A discharge-lamp lighting device may contain a choke coil having a large inductance value in a high frequency region, i.e., an air-core type or an open magnetic circuit type, so as to prevent a high-voltage pulse from jumping into a circuit at the time of lighting the lamp. However, the choke coil L1 used in this embodiment is limited to a closed magnetic circuit type, such as a toroidal, for increasing the inductance value in a low frequency region. A target value that the polarity inversion time of the lamp current is 40 $\mu$sec or less in a 80% section of the rated current is applied exclusively to a discharge-lamp devices with a power of 300 W or less.

As described above, this embodiment enables a decrease of arc jumps by shortening the polarity inversion time of a lamp current, decreasing a time that the electrode surface is at a low temperature, and by matching the returning point of the arc after the polarity inversion with the origin of the previous arc.

(Seventh Embodiment)

In the following, a seventh embodiment of the present invention will be described by referring to FIG. 1. Although this embodiment relates to a system such as a liquid crystal projector equipped with the discharge-lamp lighting device of FIG. 1, the lamp temperature detector 111 is replaced by a brightness detector for detecting brightness change of the lamp, and the feedback signal J is fed back not to the main controlling portion 102 but to a microcomputer (hereinafter, denoted as a controlling device) for controlling an apparatus such as a liquid crystal projector. The controlling device in the apparatus such as a liquid crystal projector equipped with a discharge-lamp lighting device detects working environmental temperatures of the apparatus or temperatures of vital components for protecting the vital components of the apparatus, and controls a cooling device for cooling the apparatus internal.

A specific example of the cooling device is a fan. In a DC-drive fan, the number of revolutions can be controlled by a DC voltage value provided to the power supply portion. This embodiment enables control of the temperatures of the lamp electrodes La, Lb intentionally by feeding the feedback signal J from the brightness detector 111 for detecting the change in the lamp brightness back to a controlling device of an apparatus such as a liquid crystal projector equipped with a discharge-lamp lighting device.

When the brightness change of the lamp 112 has an apparent correlation with internal or external temperature etc. of the apparatus such as a liquid crystal projector, it is also possible to write previously a setting value of the cooling device and the controlling method thereof on the controlling device of the apparatus such as a liquid crystal projector so that the temperatures of the lamp electrodes La and Lb can be controlled intentionally on the basis of the internal or external temperature of the apparatus, thereby omitting the brightness detector 111 that detects the brightness change of the lamp 112 from the discharge-lamp lighting device.

In the following, it is described, referring to FIGS. 6A and 6B, that arc jumps can be decreased by combining the first embodiment and the second embodiment so as to adjust automatically the amount and timing for superimposing the triangular wave (the single-sided triangular wave)-synthesizing signal F' on the current-controlling signal F to the DC-DC converter 106.

Figure 6A:
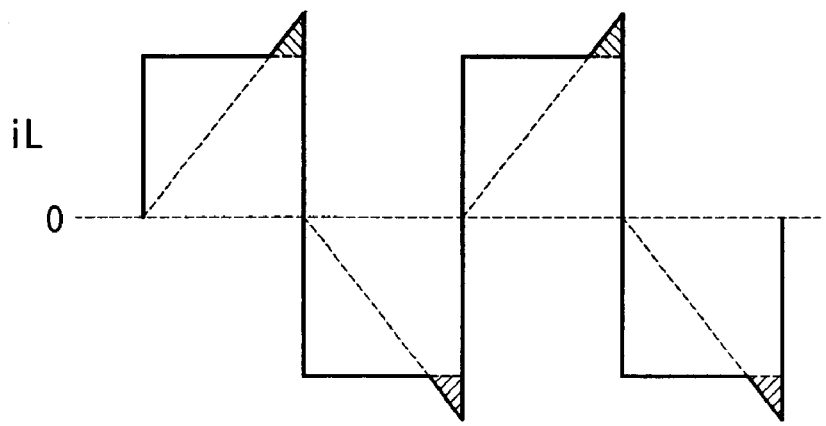
FIG. 6A shows a waveform of a lamp current iL in a discharge-lamp lighting device according to the present invention, where the lamp current is large in the initial state.
Figure 6B:
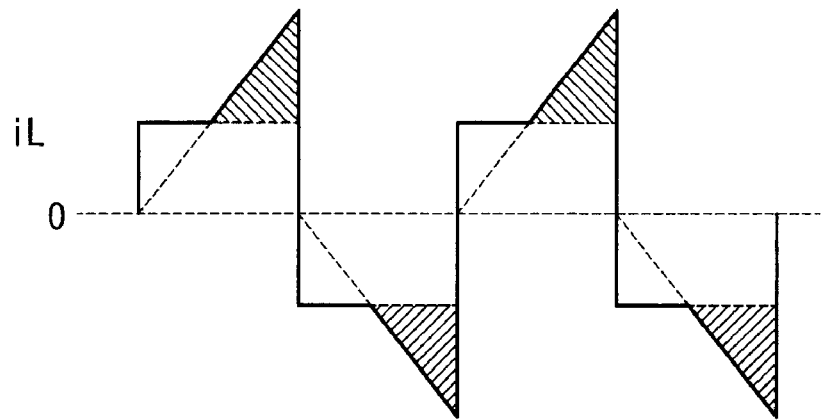
FIG. 6B shows a waveform of a lamp current iL in a discharge-lamp lighting device according to the present invention, where the lamp current is decreased due to lamp aging.

FIG. 6A shows a waveform of a lamp current iL for a case in which the lamp current is large in its initial state, while FIG. 6B shows a waveform of a lamp current iL for a case in which the lamp current is decreased due to aging of the lamp. As indicated in FIGS. 6A and 6B, since the peak values of the triangular wave signals to be superimposed are constant according to the present invention, flat parts of the lamp current iL become low due to aging of the lamp, and the superimposition amount (shaded areas in the drawing) of the triangular wave signals in the lamp current iL is increased. Accordingly, occurrence of arc jumps at the time of polarity inversion can be decreased by increasing the amount of residual heat to the lamp electrode before the polarity inversion of the lamp current even if the lamp current is decreased due to aging of the lamp.

Figure 10A:
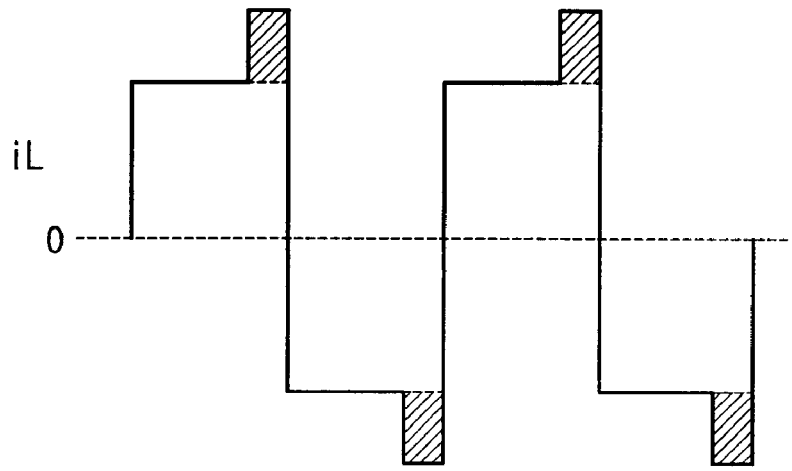
FIG. 10A shows a waveform of a lamp current iL in a conventional discharge-lamp lighting device, where the lamp current is large in the initial state.
Figure 10B:
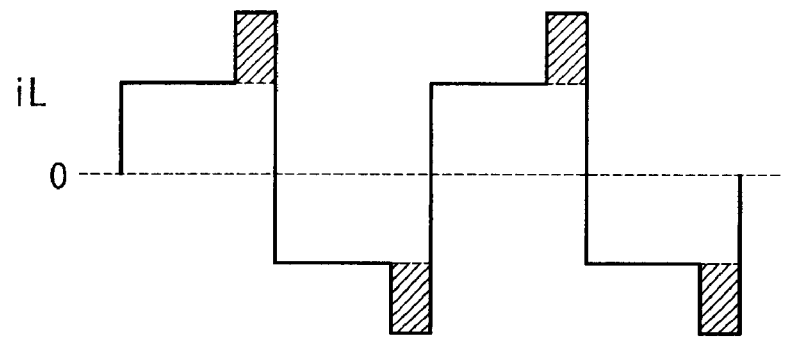
FIG. 10B shows a waveform of a lamp current iL in a conventional discharge-lamp lighting device, where the lamp current is decreased due to lamp aging.

On the contrary, in a conventional discharge-lamp lighting device, areas of superimposed pulse currents (shaded parts in the drawing) are constant in a comparison between a case that the lamp current is large in the initial state as shown in FIG. 10A and a case that the lamp current is decreased due to aging of the lamp as shown in FIG. 10B. For this reason, the amount of the residual heat to the lamp electrode is decreased before the polarity inversion of the lamp current when the lamp current is decreased due to aging of the lamp, and thus the effect of decreasing arc jumps during the polarity inversion is inferior to that of the present invention.

Next, an effect of prolongation of lamp life by use of the discharge-lamp lighting device according to the present invention will be described by referring to FIGS. 7A and 7B.

Figure 7A:
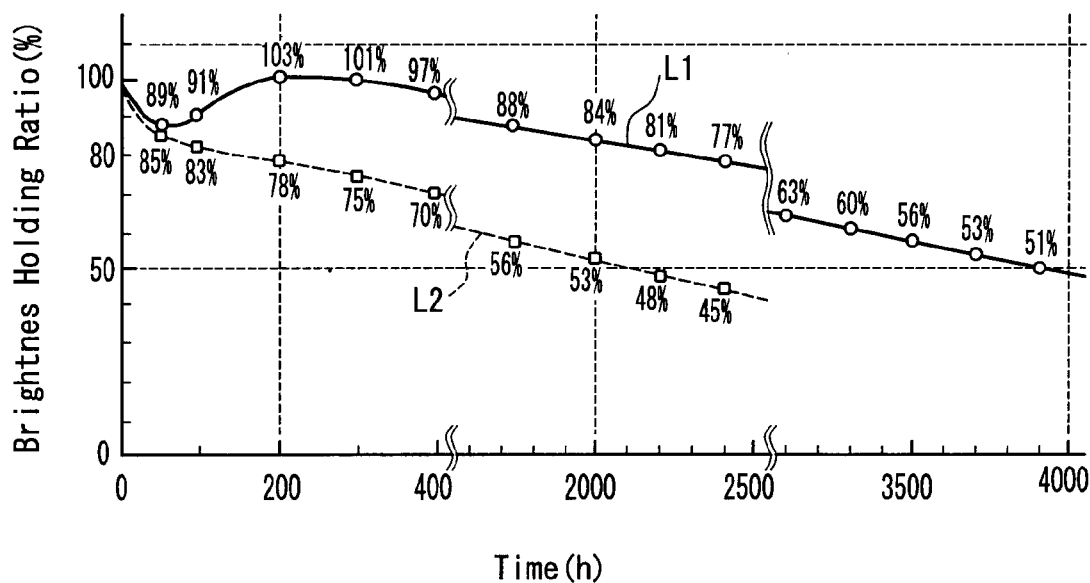
FIG. 7A is a graph showing a change of brightness holding ratio (L1) of a lamp in terms of time when using a discharge-lamp lighting device of the present invention, and a change of brightness holding ratio (L2) of a lamp in terms of time when using a conventional discharge-lamp lighting device.
Figure 7B:
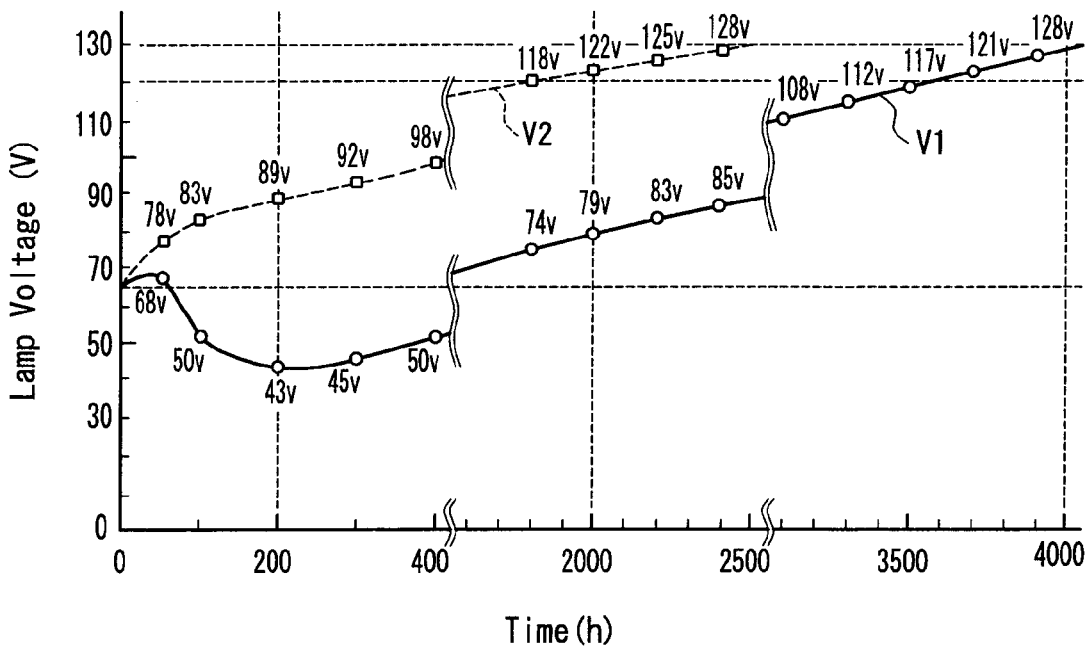
FIG. 7B is a graph showing a change of lamp voltage (V1) in terms of time when using a discharge-lamp lighting device of the present invention, and a change of lamp voltage (V2) in terms of time when using a conventional discharge-lamp lighting device.
Figure 8:
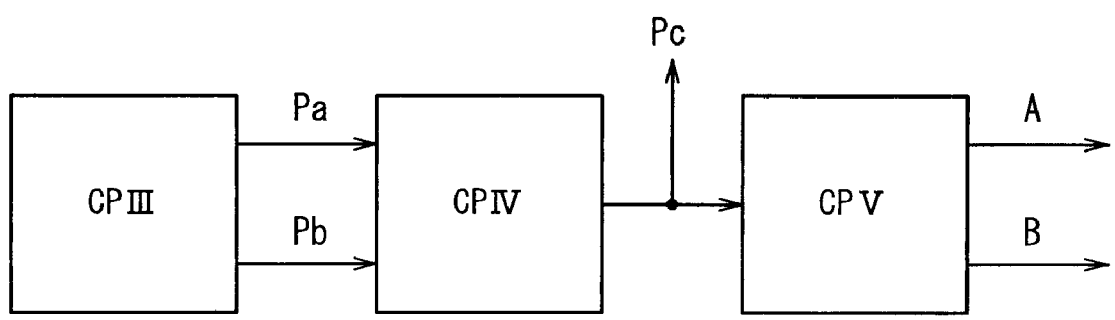
FIG. 8 is a circuit block diagram showing a structural example of a conventional discharge-lamp lighting device.
Figure 9:
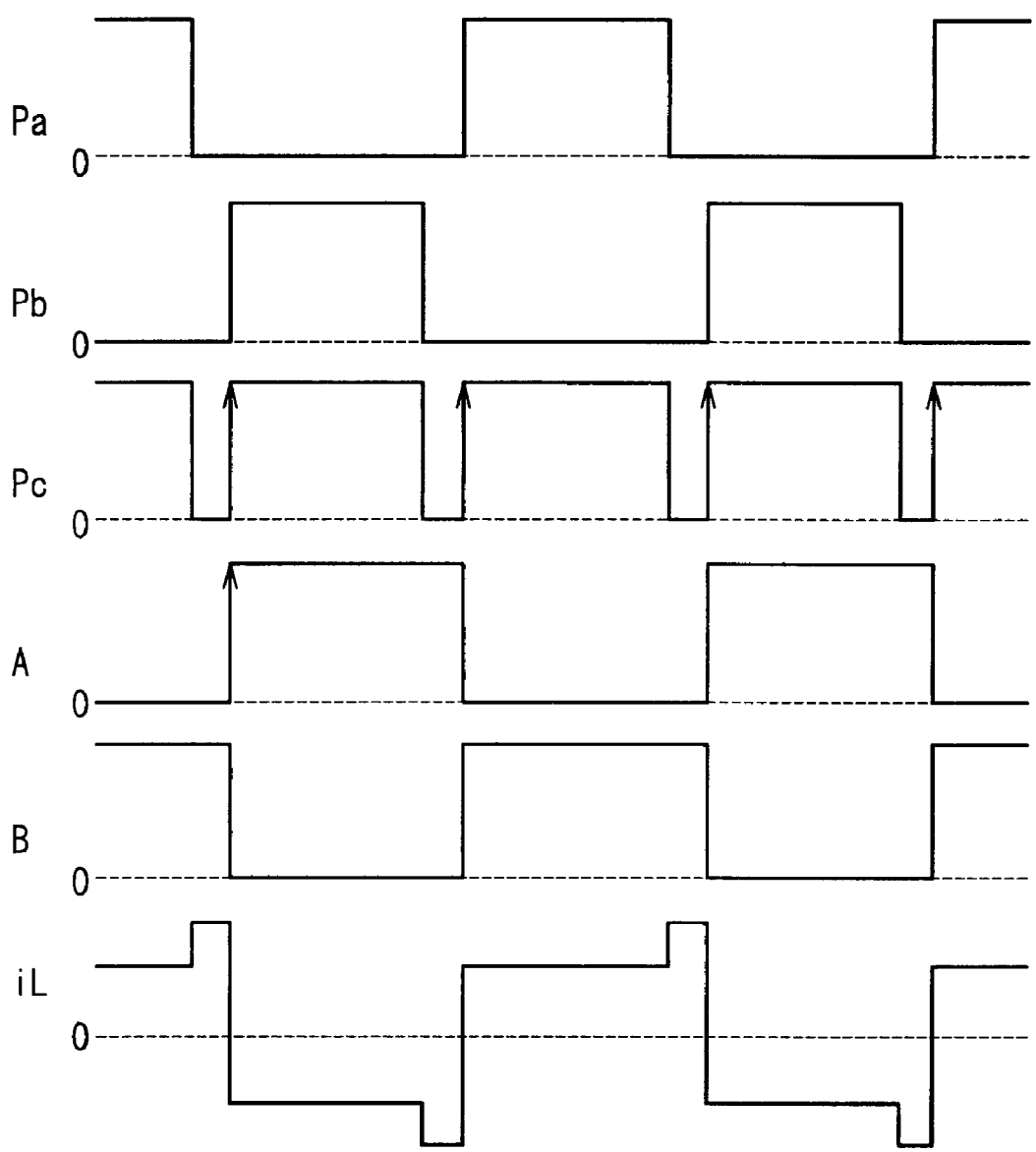
FIG. 9 shows waveforms of the respective portions of the conventional device shown in FIG. 8.

FIGS. 7A and 7B are graphs showing the prolongation of lamp lives provided by the discharge-lamp lighting device of the present invention, for a case where typical (inexpensive) small and highly efficient lamps of the same structures (the arc length is 1 mm, the bulb diameter is 10 mm, and the internal pressure is 180 atm) are used. FIG. 7A is a graph showing a change (L1) over time in a brightness holding ratio of a lamp when using a discharge-lamp lighting device according to the present invention, and a change (L2) over time in a brightness holding ratio of a lamp when using a conventional discharge-lamp lighting device. FIG. 7B is a graph showing a change (V1) over time in a lamp voltage when using a discharge-lamp lighting device according to the present invention, and a change (V2) over time in a lamp voltage when using a conventional discharge-lamp lighting device.

As shown in FIG. 7A, in general, the brightness of a lamp is lowered rapidly until 100 hours from the start of the lighting. This is considered to be for the following reason. Though an unenergized lamp has electrodes with comparatively clean tips, the condition and position of the arc formation change with respect to the initial setting at the same time of energizing due to some factors such as deformation of the electrodes, expansion of the electrodes depending on temperatures, and displacement of the electrodes. Specifically, a lamp is subjected to an aligning adjustment (adjustment of positions of a reflector and a bulb) at a point with a maximum efficiency in the manufacturing process, and apparently, for example, displacement of the arc position from the initial adjustment point can cause the rapid lowering in the brightness.

Thereafter, the electrode conditions will be stabilized, and the brightness will decrease gradually due to deterioration of the electrodes, the quartz glass, or the like. In a conventional lighting device using a typical (inexpensive) lamp, the brightness holding ratio L2 becomes 50% with respect to the initial value (according to the lamp life definition based on the half-brightness value) in about 2000 hours, and the life ends. Similarly, as shown in FIG. 7B, the lamp voltage V2 is increased gradually from its initial value (65±15 V) due to deterioration of the electrodes, and the life ends at about 120 V.

For a case of the lighting device of the present invention, the lamp brightness L1 is lowered similarly until 100 hours from the start of the lighting. This is inevitable because of the lamp structure. However, a speed of spot growth overcomes the speed of lowering the brightness as a result of competition between these two speeds from the point of about 100 hours, and the brightness rising (lowering of the lamp voltage) begins. This is provided by effective use of light beams of an optical system including a reflector, since the arc shape changes from an ellipse to a substantial dot because of the growth of the spots.

Since the lamp voltage is proportional to the internal pressure of the lamp (a pressure increase caused by evaporation of a filled material, which is proportional also to temperature) and a distance between electrodes, the growth of the spots will lower the lamp voltage V1 as well. As a result, the lamp voltage V1 will be lower by 20 V than the initial value (65 V) at a point of approximately 200 hours. Thereafter, from a point of about 400 hours, the electrodes begin to deteriorate similarly to a conventional example, and thus the lamp life can be about as twice (about 4000 hours) the conventional example.

In the above description, the triangular wave signal to be superimposed onto the current-controlling signal of the DC-DC converter 106 was a single-sided triangular wave signal (superimposed onto a back porch in every half period of the lamp current). The present invention is not limited thereto, but similar effects are obtainable by using a double-sided triangular wave signal (superimposed onto both a front porch and a back porch in every half period of the lamp current) or a parabolic wave signal.

As described above, the present invention provides, by positively accelerating the growth of spots, remarkable effects of decreasing arc jumps and suppressing fluctuation in brightness of a lamp even by using an inexpensive lamp, and also the present invention realizes a discharge-lamp lighting device with a prolonged life and a system such as a liquid crystal projector using such a discharge-lamp lighting device.

What is claimed is:

1. A discharge-lamp lighting device comprising:
  a DC-DC converter for stepping down an input DC voltage in accordance with a current-controlling signal and outputting a desired current;
  a commutator for commutating the direct current from the DC-DC converter into an alternating current in accordance with a drive-controlling signal with a rectangular waveform;
  a high-pressure discharge lamp to be fed with the alternating current from the commutator; and
  a controlling portion for outputting the drive-controlling signal and also for outputting the current-controlling signal on the basis of a value of a current flowing in the high-pressure discharge lamp or a value of voltage of the high-pressure discharge lamp in order to make electric energy in the high-pressure discharge lamp constant;

wherein the controlling portion sets a frequency of the drive-controlling signal to be within a predetermined frequency range so that sharp-pointed projections formed by an arc discharge on an electrode composing the high-pressure discharge lamp grow through a cycle of oxidation-reduction of a metal composing the electrode; superimposes a triangular wave signal generated on the basis of the drive-controlling signal onto the current-controlling signal through the entire period of the drive-controlling signal in order to make a peak value of the current flowing in the high-pressure discharge lamp constant; and adjusts the waveform of the current flowing in the high-pressure discharge lamp.

2. The discharge-lamp lighting device according to claim 1, wherein the controlling portion changes at least one of the amount and timing for superimposing the triangular wave signal onto the current-controlling signal in accordance with either the value of current flowing in the high-pressure discharge lamp or the value of voltage of the high-pressure discharge lamp.

3. The discharge-lamp lighting device according to claim 1, wherein the controlling portion changes at least one of the amount and timing for superimposing the triangular wave signal onto the current-controlling signal in accordance with a temperature of the high-pressure discharge lamp.

4. The discharge-lamp lighting device according to claim 1, wherein the controlling portion sets variably the frequency of the drive-controlling signal in accordance with either the value of current flowing in the high-pressure discharge lamp or the value of voltage of the high-pressure discharge lamp.

5. The discharge-lamp lighting device according to claim 1, wherein the controlling portion sets variably the frequency of the drive-controlling signal in accordance with the temperature of the high-pressure discharge lamp.

6. The discharge-lamp lighting device according to claim 4, wherein the controlling portion sets the frequency of the drive-controlling signal to be higher than the predetermined frequency range when the current value is equal to or higher than a predetermined value or when the voltage value is equal to or lower than a predetermined value.

7. The discharge-lamp lighting device according to claim 1, wherein the controlling portion inhibits superimposition of the triangular wave signal onto the current-controlling signal when the current value is equal to or higher than a predetermined value or when the voltage value is equal to or lower than a predetermined value.

8. The discharge-lamp lighting device according to claim 1, wherein the predetermined frequency range is from 100 Hz to 270 Hz, and the controlling portion adjusts the waveform so that the time for the polarity inversion of the current flowing in the high-pressure discharge lamp is at most 40 $\mu$sec in a 80% section of the rated current.

9. The discharge-lamp lighting device according to claim 1, wherein the discharge-lamp lighting device is provided with a choke coil connected in series with the high-pressure discharge lamp and having an inductance value higher in a low frequency region than in a high frequency region.

* * * * *